United States Patent [19]

Schnuell

[11] Patent Number: 4,870,715
[45] Date of Patent: Oct. 3, 1989

[54] CASTER INCLUDING SPRING OPERATED BRAKE

[76] Inventor: Henry A. Schnuell, 4902 N. 62nd St., Milwaukee, Wis. 53222

[21] Appl. No.: 27,539

[22] Filed: Mar. 18, 1987

[51] Int. Cl.⁴ .............................................. B60B 33/00
[52] U.S. Cl. .................................... 16/35 R; 188/1.12
[58] Field of Search ....................... 16/35 R; 188/1.12

[56] References Cited

U.S. PATENT DOCUMENTS

| | | |
|---|---|---|
| 1,958,494 | 5/1934 | Pehrsson ............................ 16/35 R |
| 2,081,594 | 5/1937 | McIntosh . |
| 2,484,094 | 10/1949 | Jackson . |
| 2,494,696 | 1/1950 | Forbes . |
| 2,709,828 | 6/1955 | Noelting . |
| 3,162,888 | 12/1964 | Mobus . |
| 3,388,419 | 6/1968 | Crawford . |
| 3,571,842 | 3/1971 | Fricke . |
| 3,828,392 | 8/1974 | Bolger . |
| 3,881,216 | 5/1975 | Fontana . |
| 3,890,669 | 6/1975 | Reinhards . |
| 4,035,864 | 7/1977 | Schroder . |
| 4,348,784 | 9/1982 | Fontana . |
| 4,449,268 | 5/1984 | Schnuell . |
| 4,706,328 | 11/1987 | Broeske ............................. 16/35 R |

*Primary Examiner*—Nicholas P. Godici
*Assistant Examiner*—Carmine Cuda

[57] ABSTRACT

An improved caster construction wherein a brake is provided for selectively braking both the wheel against rotation and the yoke against rotation around the axis of the post of the caster. The post includes a lower end having a nut fixed thereto and the brake includes a brake plate having a socket for selectively engaging the nut to prevent rotation of the yoke about the axis of the post and a resilient wire spring for selectively biasing the brake plate into the brake engagement.

7 Claims, 2 Drawing Sheets

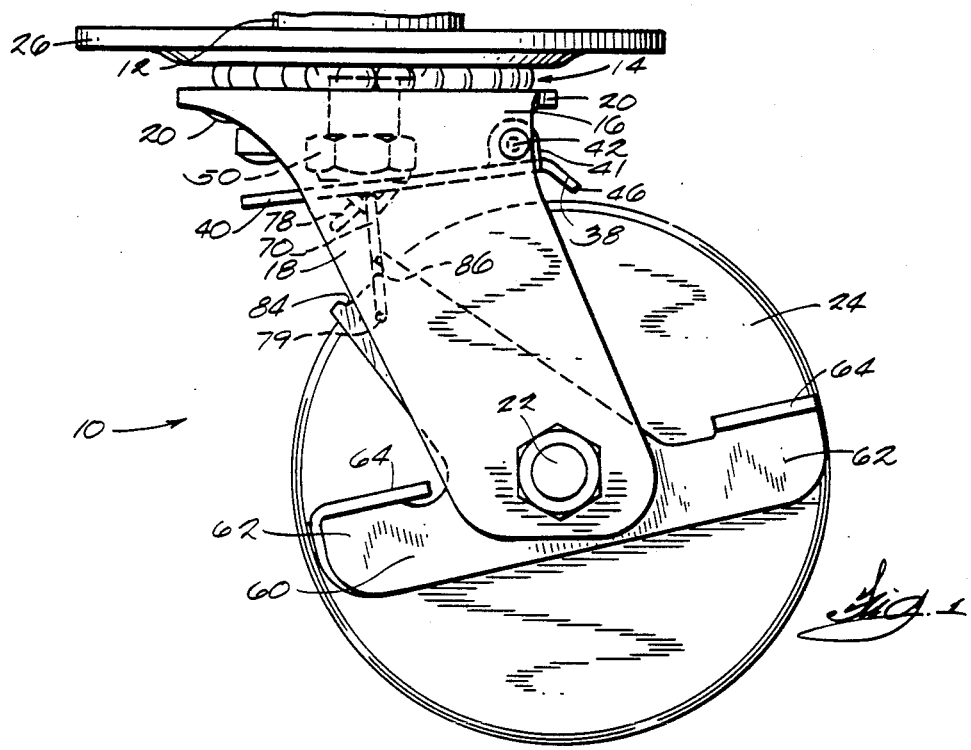
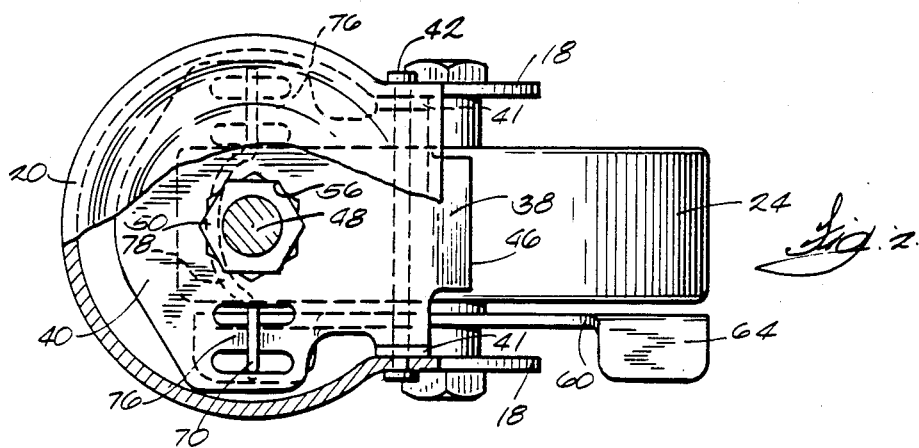
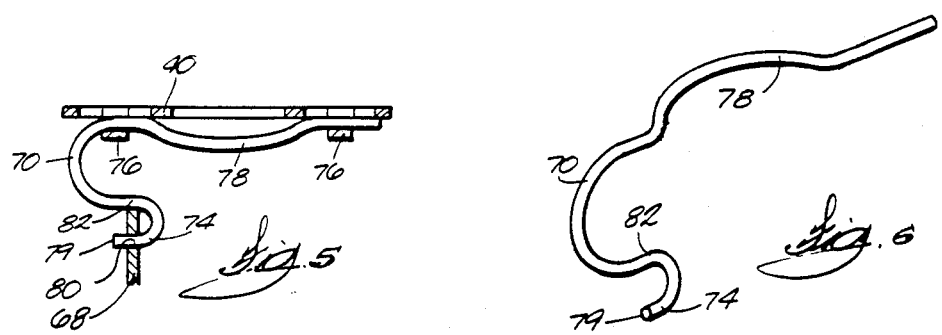

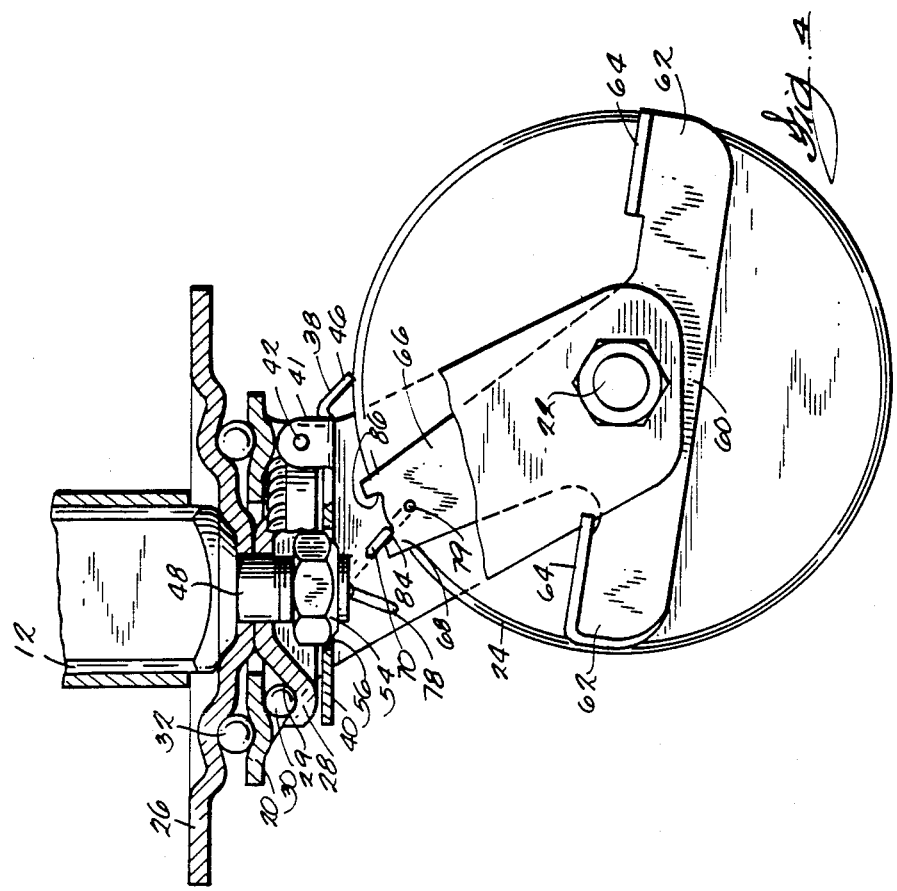
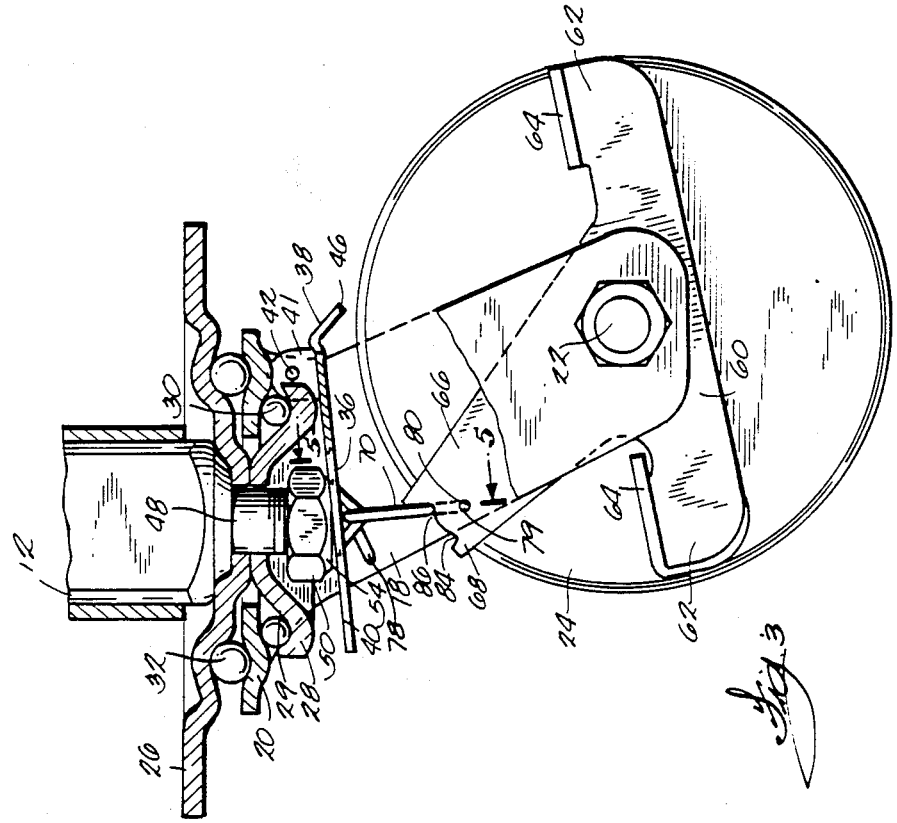

CASTER INCLUDING SPRING OPERATED BRAKE

RELATED APPLICATIONS

Attention is directed to applicant's copending U.S. Patent Application Ser. No. 856,024, filed Apr. 25, 1986 and assigned to the assignee of the present invention.

FIELD OF THE INVENTION

The invention relates to casters and more particularly to brake or locking mechanisms for casters and for braking the wheels of the casters and for locking the casters to prevent rotation of the casters about a vertical axis.

BACKGROUND PRIOR ART

In many applications for casters it is desirable that a caster include means for braking the wheel of the caster against rotation and means for simultaneously braking the caster yoke against rotation about the axis of the caster post.

An example of such prior art casters is illustrated in applicant's U.S. Pat. No. 4,449,268, issued May 22, 1984. Another example of a prior art caster construction is illustrated in the U.S. Bolger Patent No. 3,828,392, issued Aug. 13, 1974.

Attention is also directed to the U.S. Fontana Patent No. 4,348,784, issued Sept. 14, 1982; the U.S. Forbes Patent No. 2,494,696, issued Jan. 17, 1950; the U.S. Reinhards Pat. No. 3,890,669, issued June 24, 1975; the U.S. Jackson Pat. No. 2,484,094, issued Oct. 11, 1949; and the U.S. Crawford Pat. No. 3,388,419, issued June 18, 1968.

Attention is further directed to the U.S. Noelting et al. Pat. No. 2,709,828, issued June 7, 1955; the U.S. Fricke Pat. No. 3,571,842, issued Mar. 23, 1971; the U.S. Schroder Pat. No. 4,035,864, issued July 19, 1977; the U.S. McIntosch Pat. No. 2,081,594, issued May 25, 1937; the U.S. Mobus Pat. No. 3,162,888, issued Dec. 29, 1964 and the U.S. Fontana Patent No. 3,881,216, issued May 6, 1975.

SUMMARY OF THE INVENTION

The present invention provides an improved caster construction wherein there is an improved means for braking the caster wheel and an improved means for preventing rotation of the caster yoke and wheel around the axis of the post of the caster. The caster includes a load supporting member or post, a yoke including parallel downwardly extending parallel arms, and a wheel housed between the arms and supported for rotation about a first axis. The caster also includes means for selectively braking the wheel against rotation about the first axis and the yoke against rotation about the second axis, the means for braking including a brake member supported by said yoke for pivotal movement between a disengaged position and a braking position, the brake member including opposite ends and being supported for pivotal movement intermediate said opposite ends. One of said opposite ends of the brake member includes an aperture and is movable between a disengaged position wherein it is spaced from the lower end of the support member and a second position wherein a lower end portion of the post is housed in the aperture. The aperture has a configuration for engaging the lower end of the post. Means are also provided for causing movement of the brake member from the disengaged position to the braking position, this structure including a brake lever having opposite ends and supported for pivotal movement about the axis of rotation of the wheel between a brake engaging position and a brake release position, and a wire spring joining the brake lever to the brake member.

Various features and advantages of the invention will be apparent by reference to the following description of a preferred embodiment, from the drawings and from the claims.

BRIEF DESCRIPTION OF THE DRAWINGS

FIG. 1 is a side elevation view of a caster embodying the invention.

FIG. 2 is a plan view of the caster illustrated in FIG. 1.

FIG. 3 is a view similar to FIG. 1 and with portions shown in cross section.

FIG. 4 is a view similar to FIG. 1 and showing the brake member in a brake release position.

FIG. 5 is a partial cross section view taken along line 5—5 in FIG. 3.

FIG. 6 is a perspective view of the spring shown in FIG. 5.

Before describing a preferred embodiment of the invention in detail, it is to be understood that the invention is not limited in its application to the details of construction nor to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is a caster 10 embodying the invention and including a load supporting member 12. While the load supporting member 12 could have various configurations depending on the intended use of the caster 10 and the load carried by the caster, in the illustrated arrangement it comprises a post supported by a bearing assembly 14, in turn, supported by a caster yoke 16. The cater yoke 16 is comprised of a pair of downwardly extending legs 18 joined at their upper ends by a horizontal plate or web 20. The lower ends of the legs 18 of the yoke 16 support an axle 22 which, in turn, supports the caster wheel 24.

The bearing assembly 14 is comprised of a pair of spaced apart generally circular bearing races 26 and 28 (FIGS. 3–4) which support the central vertical post 12 and are positioned above and below the web 20 of the yoke 16 to sandwich the web 20 therebetween. The upper surface 29 of the lower race 28 defines a circular bearing surface surrounding the vertical axis of the central vertical post 12 and is adapted to support a plurality of ball bearings 30 engageable with a circular bearing race defined by the lower surface of the web 20. The lower surface of the upper race 26 defines a second circular bearing surface surrounding the axis of the post 12 and for supporting the ball bearings 32 engageable with a circular bearing race defined by the upper surface of the web 20.

Means are further provided for selectively braking the wheel 24 against rotation about the axle 22 and for simultaneously preventing rotation of the caster 10

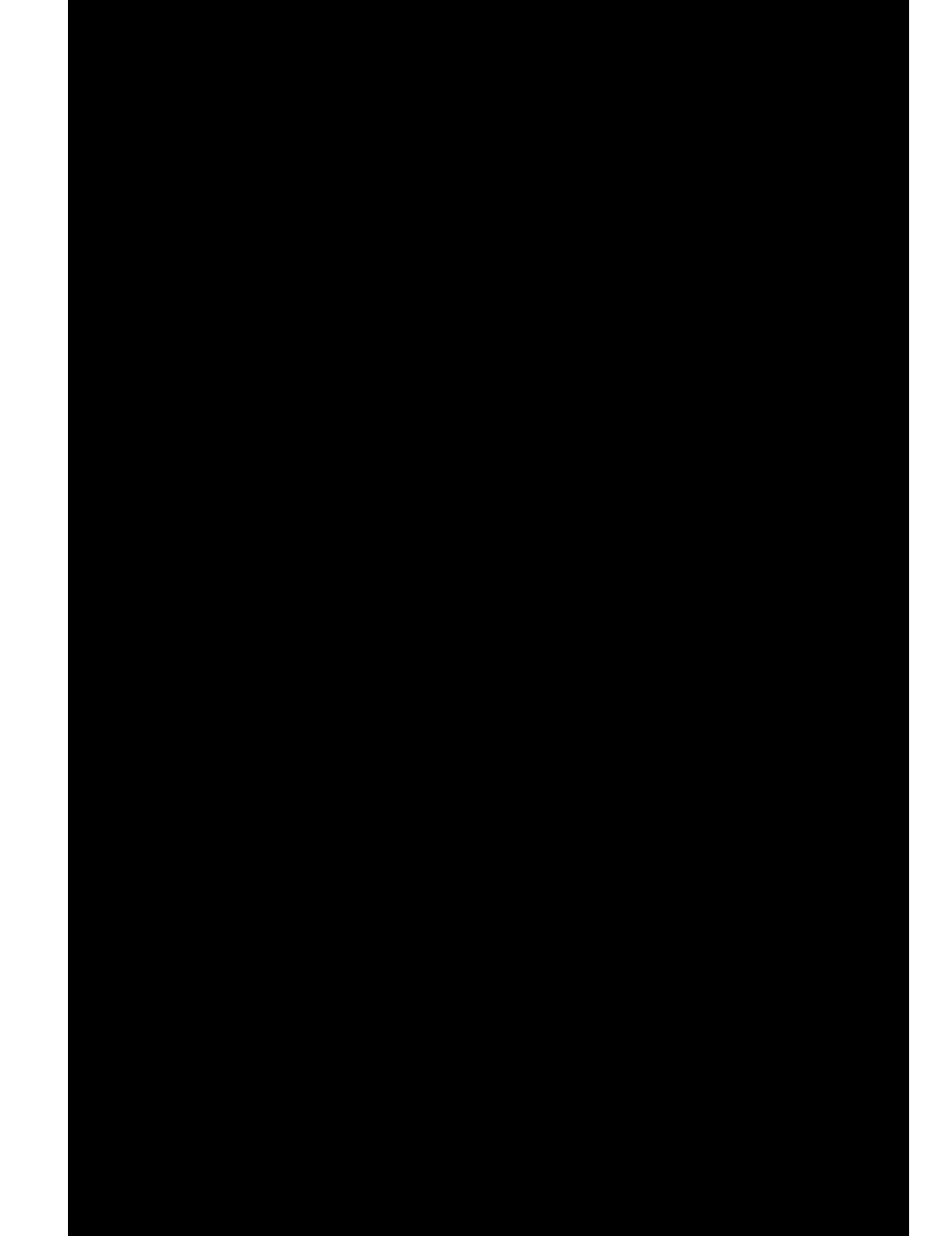

a yoke including a pair of generally parallel downwardly extending parallel arms, a wheel housed between said generally parallel arms and supported for rotation by the generally parallel arms about a first axis, means for rotatably joining said yoke to said load supporting member for rotation about a second axis, and means for selectively braking said wheel against rotation about said first axis and said yoke against rotation about said second axis, said means for braking including a brake member supported by said yoke for pivotal movement between a disengaged position and a braking position, the brake member including opposite ends and being supported for pivotal movement intermediate said opposite ends, one of said opposite ends of said brake member including an aperture, said one of said opposite ends of said brake member being movable between a disengaged position wherein said one of said opposite ends of said brake member is spaced from said lower end of said load supporting member and a second position wherein said lower end portion of said load supporting member is housed in said aperture, said aperture having a configuration for engaging said lower end of said load supporting member such that one of said opposite ends of said brake member prevents rotation of said load supporting member with respect to said brake member, and means for causing movement of said brake member from said disengaged position to said braking position, said means for causing movement of said brake member including a brake lever having opposite ends supported for pivotal movement about said axis of rotation of said wheel between a brake engaging position and a brake release position, and spring means between said brake lever and said brake member, said spring means being in compression and applying a force on said brake member to bias said brake member toward said braking position when said brake lever is moved to said brake engaging position.

2. A caster comprising:

a load supporting member having a central longitudinal axis and adapted to support a load, said load supporting member including a lower end portion;

a yoke including a pair of generally parallel downwardly extending parallel arms, a wheel housed between said generally parallel arms and supported for rotation by the generally parallel arms about a first axis, means for rotatably joining said yoke to said load supporting member for rotation about a second axis, and means for selectively braking said wheel against rotation about said first axis and said yoke against rotation about said second axis, said means for braking including a brake member supported by said yoke for pivotal movement between a disengaged position and a braking position, the brake member including opposite ends and being supported for pivotal movement intermediate said opposite ends, one of said opposite ends of said brake member including an aperture, said one of said opposite ends of said brake member being movable between a disengaged position wherein said one of said opposite ends of said brake member is spaced from said lower end of said load supporting member and a second position wherein said lower end portion of said load supporting member is housed in said aperture, said aperture having a configuration for engaging said lower end of said load supporting member such that said one of said opposite ends of said brake member prevents rotation of said load supporting member with respect to said brake member, and means for causing movement of said brake member from said disengaged position to said braking position, said means for causing movement of said brake member including a brake lever having opposite ends and supported for pivotal movement about said axis of rotation of said wheel between a brake engaging position and a brake release position, and spring means joining said brake lever to said brake member, said spring means applying a force on said brake member biasing said brake member toward said braking position when said brake lever is moved to said brake engaging position, said lower end portion of said load supporting member including a nut fixed thereto, said nut including a periphery having a plurality of substantially flat surfaces, and wherein said aperture defines a socket adapted to house said nut when said brake member is moved to said braking position, said other of said opposite ends of said brake member is movable between a disengaged position and a wheel engaging position wherein said wheel is prevented from rotating about said axis of rotation, said spring means for joining said brake lever to said brake member including a resilient wire spring having one end joined to said brake lever and an upper end connected to said brake member for causing movement to said brake member between a braking position and a disengaged position, said one of said opposite ends of said brake member including means for pivotally engaging an upper end of said resilient spring member, said upper end of said resilient spring member including spaced apart linear portions having a common axis, wherein said means for pivotally engaging an upper end of said resilient spring member includes a first means for pivotally housing one of said spaced apart linear portions and second means for pivotally housing a second of said spaced apart linear portions, and said upper end of said resilient spring member including a curved portion between said spaced linear portions adapted to selectively engage said lower surface of said brake member.

3. A caster as set forth in claim 1 wherein said brake lever further includes an arm extending toward said brake member, said arm including an upper end pivotally connected to an opposite end of said spring means, and said upper end of said arm including detent means for resiliently housing a portion of said opposite end of said spring means, said detent means including a first detent portion for housing said portion of said spring means in a first position when said brake lever is in a first position and a second detent portion for releaseably supporting said portion of said spring means in a second position.

4. A caster comprising:

a load supporting member having a central longitudinal axis and adapted to support a load, said load supporting member including a lower end portion, a yoke including a pair of generally parallel downwardly extending parallel arms, a wheel housed between said generally parallel arms and supported for rotation by the generally parallel arms about a first axis, means for rotatably joining said yoke to said load supporting member for rotation about a second axis, and means for selectively braking said hweel against rotation about said first axis said means for braking including a brake member supported by said yoke for pivotal movement between a disengaged position and a braking position, the brake member being supported for pivotal movement between a disengaged position wherein a portion of said brake member is spaced from said wheel and a second position wherein said portion of said brake member engages said wheel, and means for causing movement of said brake member from said is engaged position to said braking position, said means for causing movement of said brake member including a brake lever having opposite ends and supported for pivotal movement about said axis of rotation of said wheel between a brake engaging position and a brake release position, and spring means for joining said brake lever to said brake member, said spring means for joining said brake lever to said brake member including a resilient wire spring having one end joined to said brake lever and an upper end connected to said brake member for causing movement of said brake member between a braking position and a disengaged position, said brake member including a lower surface having means for pivotally engaging an upper end of said resilient spring member, said upper end of said resilient spring member including spaced apart linear portions having a common axis, said means for pivotally engaging including a first means for pivotally housing one of said spaced apart linear portions and second means for pivotally housing a second of said spaced apart linear portions, and said upper end of said resilient spring member including a curved portion between said spaced linear portions adapted to selectively engage said lower surface of said brake member.

5. A caster as set forth in claim 4 wherein said brake lever further includes an arm extending generally upwardly toward said brake member, said arm including an upper end pivotally connected to an opposite end of said spring means, and said upper end of said arm including detent means for resiliently housing a portion of said spring means, said detent means including a first detent portion for housing said portion of said spring means in a first position when said brake lever is in a first position and a second detent portion for releaseably supporting said portion of said spring means in a second position.

6. A caster comprising:

a load supporting member having a central longitudinal axis and adapted to support a load, said load supporting member including a lower end portion, a yoke including a pair of generally parallel downwardly extending parallel arms, a wheel housed between said generally parallel arms and supported for rotation by the generally parallel arms about a first axis, means for rotatably joining said yoke to said load supporting member for rotation about a second axis, and means for selectively braking said yoke against rotation about said second axis, said means for braking including a brake member supported by said yoke for pivotal movement between a disengaged position and a braking position, the brake member including portion defining an aperture and being supported for pivotal movement between a disengaged position wherein said portion of said brake member is spaced from said lower end of said support member and a second position wherein said lower end portion of said support member is housed in said aperture, said aperture having a configuration for engaging said lower end of said load supporting member such that said one of said opposite ends of said brake member prevents rotation of said load supporting member with respect to said brake member, and means for causing movement of said portion of said brake member from said disengaged position to said braking position, said means for causing movement of said brake member including a brake lever having opposite ends and supported for pivotal movement about said axis of rotation of said wheel between a brake engaging position and a brake release position, and spring means for joining said brake lever to said brake member, said lower portion of said load supporting member including a nut fixed to said load supporting member, said nut including a plurality of substantially flat surfaces, and wherein said aperture defines a socket adapted to house said nut when said brake member is moved to said braking position, said spring means for joining said brake lever to said brake member including a resilient wire spring having one end joined to said brake lever and an upper end connected to said brake member for causing movement of said brake member between a braking position and a disengaged position, said brake member including a lower surface having means for pivotally engaging a upper end of said resilient spring member, said upper end of said resilient spring member including spaced apart linear portions having a common axis, said means for pivotally engaging including a first means for pivotally housing one of said spaced apart linear portions and second means for pivotally housing a second of said spaced apart linear portions and said upper end of said resilient spring member including a curved portion between said spaced linear portions adapted to selectively engage said lower surface of said brake member.

7. A caster as set forth in claim 6 wherein said brake lever further includes an arm extending toward said brake plate, said arm including an upper end pivotally connected to an opposite end of said spring means and said upper end of said arm including detent means for resiliently housing a portion of said spring means, said detent means including a first detent portion for housing said portion of said spring means in a first position when said brake lever is in a first position and a second detent portion for releaseably supporting said portion of said spring means in a second position.

* * * * *